United States Patent Office 2,782,869
Patented Feb. 26, 1957

2,782,869
PREPARATION OF SILICA GELS

Earl H. Gray, Bartlesville, Okla., assignor to Phillips Petroleum Company, a corporation of Delaware No Drawing. Application July 2, 1951,
Serial No. 234,899

43 Claims. (Cl. 183—114.2)

This invention relates to gel-type adsorbents. In one of its more specific aspects this invention relates to a method for preparing gel-type adsorbents.

Gels as adsorbents have been widely studied and it is well known that gels adsorb vapors of various organic compounds. As a result silica gels are employed in vapor recovery systems for recovering these organic compounds, or for removing them from gaseous streams. Gels, particularly silica gels, therefore, find many uses in processes requiring the removal of organic compounds from gaseous streams. For example silica gels are desirable for the removal of benzene from a cracked gas stream. The adsorption of gases and vapors by silica gels, or other adsorbents, depends upon two factors: first, the specific adsorptive capacity of the gel and, second, the capillary adsorption action. These two factors taken together make up the total adsorptive capacity or saturation value of an adsorbent.

An object of this invention is to provide a gel-type adsorbent having, on a weight basis, an increased total adsorptive capacity for a specific hydrocarbon.

Another object of this invention is to provide a process for preparing gel-type adsorbents for continuous adsorption.

A further object of the present invention is to provide a silica gel having extensive application in adsorption problems, for example those encountered in the removal of components from vapor streams.

A still further object of the instant invention is to provide a silica gel which is particularly desirable for use in vapor recovery systems.

Other objects will be more apparent to those skilled in the art from the accompanying discussion and disclosure.

In accordance with this invention silica gels or other metal oxide gel adsorbents are made in the presence of the hydrocarbon to be subsequently contacted. Some hydrocarbons applicable to this invention are benzene and substituted benzene, said substituted benzene having at least one attached acyclic hydrocarbon radical, the total number of carbon atoms in the substituents not exceeding six. As examples of substituted benzenes having at least one attached acyclic hydrocarbon radical can be mentioned toluene, the xylenes, ethylbenzene, cumene, the diisopropyl benzenes, styrene and tertiary butylbenzene.

In one embodiment of this invention I have found that by the process of this invention silica gels can be obtained having, among other properties, increased total adsorptive capacities on a weight basis for a particular hydrocarbon. Such adsorption gels find utility in vapor phase as well as in liquid phase selective adsorption. Thus, silica gels or other metal oxide gels having an increased adsorptive capacity for specific hydrocarbons can be prepared by making said gels in the presence of the hydrocarbon which is to be subsequently adsorbed. For example when a silica gel to be subsequently contacted with benzene is desired, an improved gel is obtained by making the gel with benzene present as an emulsion during preparation.

The preparation of gels by the coagulation of colloidal solutions is well known; therefore a lengthy discussion is unnecessary. Metal oxide gels such as alumina gels are usually thrown down from a metal salt solution with alkali. Ordinarily silica gels are prepared by reacting a solution of a water-soluble silicate, such as sodium silicate, with an acid, such as hydrochloric acid or sulfuric acid. A hydrogel is formed having about 10 percent silica and about 90 percent water. The proportions and concentrations of the acid and silicate solutions are usually controlled to yield gels having the desired amount of silica. If too little acid is used the silicate solution will not harden to the gel. On the other hand an excess of acid would only increase the expense involved. Increased temperatures will merely increase the speed of the gel formation. The proportion of the silicate solution and the acid, and their concentrations, are generally such that a slightly acid liquid results. The sol then slowly hardens to a hydrogel due to syneresis phenomena. The hydrogel can then be washed and recovered in any conventional manner.

In accordance with the present invention any method of preparation of the gel-type adsorbent can be employed so long as the gel is made in the presence of the hydrocarbon to be subsequently contacted. Gel-type adsorbents are metal oxide adsorbents, for example activated alumina, chromia, chromia-alumina, and the like. Suitable hydrocarbons are, for example, benzene and substituted benzenes having at least one attached acyclic hydrocarbon radical, the total number of carbon atoms in the substituents being not greater than six. The amount of hydrocarbon employed can be varied over a considerable range and can be conveniently based on the amount of water present. Ordinarily from 2 percent to 200 percent or more of the hydrocarbon on a volume basis can be used. I prefer to employ the hydrocarbon in an amount about equal to the total amount of water present by volume; that is the amount by volume of hydrocarbon used will preferably be equal to the amount of water used in making the aqueous solution of the soluble silicate, plus the amount of water used in diluting the acid employed.

One convenient method for preparing a silica gel in accordance with this invention is to emulsify a mixture of the sodium silicate solution and the hydrocarbon and subsequently acidify the emulsion so as to cause gel formation. After the gel has been formed, washed and dried, the sensitizing material is then removed in any conventional manner and the gel is ready for use. In greater detail a silica gel can be prepared by maintaining, by vigorous agitation, an emulsion consisting of about two volumes of benzene and about one volume of a 20 percent aqueous solution of sodium silicate. Hydrochloric acid is then added in sufficient quantity and at a proper rate to acidify the emulsion. The sol will then harden to the adsorbent silica gel. If desired an emulsifying agent, for instance, sodium salts of alkyl benzylsulfonates or phenol ethylene oxide condensation products and the like can be used.

A desirable method for preparing a silica gel in accordance with the instant invention is illustrated in the following example.

EXAMPLE

As an example of the invention, silica gel was prepared in the presence of benzene by mixing 900 ml. of sulfuric acid (specific gravity, 1.2) with 1800 ml. of benzene (reagent grade). The mixture was cooled to 44° F., and 900 ml. of sodium silicate solution (specific gravity, 0.8) cooled to 44° F. were added. The sodium silicate solution was added to the benzene-sulfuric acid mixture at 44° F. during a five-minute period. The mixture was then warmed to 175° F. and maintained at that temperature for 3 hours. The resulting hydrogel was subsequently washed by filtration and resuspension in hot distilled water (about 175° F.) until the filtrate gave a negative test for sulfate with barium nitrate solution. The hydrogel was dried in air at 225° F. for 48 hours so as to convert the same to a dry, hard gel.

As mentioned heretofore a gel-type adsorbent prepared in accordance with one embodiment of this invention has an increased total capacity on a weight basis for a particular hydrocarbon when made with that hydrocarbon present as an emulsion. In some cases the gel may also have an increased capacity for a closely related hydrocarbon. In another embodiment of this invention gel-type catalysts are prepared by coagulation in the presence of hydrocarbons toward which catalytic activity is desired. To investigate the effect of preparing silica gels in the presence of a hydrocarbon to be later contacted three adsorbents were obtained. One silica gel, Example A, was prepared in accordance with the procedure set forth in the preceding paragraph. Another silica gel, Example B, a control gel, was prepared under the same conditions as Example A but in the absence of benzene. The third gel, Example C, employed was a purchased commercial silical gel. The method of preparation of this latter gel, which passed a 200 mesh sieve, is not known, but it is believed to be similar to the control gel except that the commercial gel is calcined at a temperature above 500° F. The following table shows in tabular form the results obtained in comparison tests of the three gels employed.

Table

|  | Example C Commercial Gel | Example B Control Gel | Example A Gel of the Invention |
| --- | --- | --- | --- |
| Surface area, sq. m./gram: |  |  |  |
| Degassed at 175° F |  | 835 | 837 |
| Degassed at 662° F | 632 | 756 | 766 |
| Percent decrease caused by degassing at 662° F |  | 9.5 | 8.5 |
| Relative surface area, degassed at 662° F | 1.00 | 1.20 | 1.21 |
| Apparent density, g/ml: |  |  |  |
| Poured | 0.66 | 0.41 | 0.41 |
| Relative | 1.00 | 0.62 | 0.62 |
| Packed | 0.75 | 0.69 | 0.67 |
| Relative | 1.00 | 0.92 | 0.89 |
| Total capacity, ml. benzene adsorbed (K): |  |  |  |
| Weight basis, per gram adsorbent | 0.342 | 0.405 | 0.431 |
| Relative | 1.00 | 1.18 | 1.26 |

The preceding table shows that the total capacity of the gel prepared according to the instant invention, Example A, was 1.26, while the total capacity of a commercial gel was 1.00.

The adsorption apparatus employed comprised: (a) a closed-arm manometer and a Pyrex glass manifold to which adsorption bulbs were attached by standard-taper ground-glass joints, both contained in a constant-temperature air cabinet; (b) a container for the adsorbate liquid located immediately outside the constant-temperature cabinet and connected to the manifold by a short heated line; (c) a constant-temperature Silicone-oil bath for heating the adsorbate liquid container; (d) 100-ml. adsorption bulbs with standard-taper ground-glass joints for attachment to the manifold and stopcocks to permit removal of the evacuated bulbs from the manifold for weighing; and (e) a vacuum system comprising a Welsh Duo-Seal Model 1406 H mechanical pump, a distillation products single-stage glass diffusion pump, and a Pirani vacuum gauge.

The temperature in the air cabinet was controlled to ±0.5° F. with an 8-junction Chromel-Alumel thermocouple used in conjunction with a Micromax potentiometric controller and a cone resistance heater; that in the oil bath was controlled to ±1.0° F. with a bimetallic thermoregulator used in conjunction with an immersion heater.

The total capacity of the adsorbent was determined by degassing it for 16 hours at a pressure of about 3 mm. mercury and a temperature of 175° F., heating it to 125° F. and exposing it to benzene vapor at a pressure of about 155 mm. mercury for 16 hours. This determination at about 0.6 saturation pressure has been shown to give the total capacity of the commercial gel, and was assumed to give that of the gels made in the laboratory.

The surface area of the adsorbents was determined by using the low-temperature nitrogen adsorption method developed by Brunauer, Emmett and Teller, and described in The Journal of the American Chemical Society, vol. 60, p. 309 (1938).

The apparent density of the adsorbents which passed a 200 mesh sieve was determined by (1) pouring them into a 50 ml. graduate and weighing, and (2) packing them into the graduate until tapping the side of the graduate 30 times changed the volume less than 0.1 ml.

The above table clearly shows the increased total adsorptive capacity of the silica gel prepared in accordance with my invention. The silica gel of this invention is superior to the other gels when they are compared on a weight basis. In some cases the selectivity will be decreased slightly; however because of their increased adsorptive capacity the silica gels prepared in accordance with this invention will find utility in many vapor recovery systems where total capacity is important. For instance the high capacity gels prepared as herein disclosed will be especially useful in the removal of benzene or other hydrocarbons from cracked gas streams.

Obviously many modifications or variations of the invention as hereinbefore set forth may be made without departing from the spirit and scope thereof and, therefore, only such limitations should be imposed as are indicated in the appended claims.

I claim:

1. A process for preparing a gel-type adsorbent which comprises precipitating gel-forming constituents in admixture with a hydrocarbon to be subsequently contacted and converting the resulting precipitate to a dry hard gel, said hydrocarbon selected from the group consisting of benzene and substituted benzene, said substituted benzene having at least one attached acyclic hydrocarbon radical, the total number of carbon atoms in the substituents not exceeding six.

2. A process for preparing a gel-type adsorbent which comprises coagulating hydrogel-forming constituents to a hydrogel in admixture with a hydrocarbon selected from the group consisting of benzene and substituted benzene, said substituted benzene having at least one attached acyclic hydrocarbon radical, the total number of carbon atoms in the substituents not exceeding six, and converting the resulting hydrogel to a dry hard gel.

3. A process for preparing a silica gel which comprises forming silica hydrogel by coagulation in a colloidal aqueous solution of a water-soluble silicate with an acid in the presence of a hydrocarbon selected from the group consisting of benzene and substituted benzene, said substituted benzene having at least one attached acyclic hydrocarbon radical, the total number of carbon atoms in the substituents not exceeding six, in the form of an emulsion in said colloidal solution, converting said hydrogel to a dry hard gel, and recovering said gel.

4. A process for preparing a silica gel which comprises acidifying an emulsion of benzene and a silicate solution so as to form a silica hydrogel, and converting said hydrogel to a dry hard gel.

5. A process for preparing a silica gel which comprises acidifying an emulsion of aqueous sodium silicate and benzene so as to form a silica hydrogel, and converting said hydrogel to a dry hard gel.

6. A process for preparing a silica gel which comprises acidifying an emulsion of paraxylene and a silicate solution so as to form a silica hydrogel, and converting said hydrogel to a dry hard gel.

7. A process for making a silica gel which comprises mixing sulfuric acid and benzene, adding a water-soluble silicate to the mixture so as to form a silica hydrogel and converting said hydrogel to a dry hard gel.

8. A process for making a silica gel which comprises mixing sulfuric acid and benzene, adding sodium silicate to the mixture so as to form a silica hydrogel and converting said hydrogel to a dry hard gel.

9. A process for preparing a silica gel having an increased total capacity for benzene which comprises mixing sulfuric acid with benzene and adding aqueous sodium silicate to the mixture, the amount of sulfuric acid employed being sufficient to acidify the sodium silicate solution and form a silica hydrogel, and the amount of benzene employed being in the range of 2–200% by volume of the water present and converting said hydrogel into a dry hard gel.

10. A process for preparing a silica gel having an increased total capacity for benzene which comprises mixing sulfuric acid with benzene, adding sodium silicate to the mixture, recovering the silica gel so formed and removing the adsorbed benzene, the amount of sulfuric acid employed being sufficient to acidify the sodium silicate solution, and the amount of benzene employed being about equal to the amount of water present.

11. A gel-type adsorbent prepared in accordance with claim 1.

12. A gel-type adsorbent prepared in accordance with claim 3.

13. A gel-type adsorbent prepared in accordance with claim 5.

14. A process for removing a hydrocarbon from a gaseous stream which comprises passing said gaseous stream over a gel-type adsorbent which was precipitated in the presence of the hydrocarbon to be removed, said hydrocarbon selected from the group consisting of benzene and substituted benzene, said substituted benzene having at least one attached acyclic hydrocarbon radical, the total number of carbon atoms in the substituents not exceeding six.

15. A process for removing a hydrocarbon from a gaseous stream which comprises passing said gaseous stream over a silica gel precipitated with the particular hydrocarbon present as an emulsion during the preparation of said gel, said hydrocarbon selected from the group consisting of benzene and substituted benzene, said substituted benzene having at least one attached acyclic hydrocarbon radical, the total number of carbon atoms in the substituents not exceeding six.

16. A process for removing benzene from a gaseous stream containing benzene which comprises passing said stream over a silica gel which was made with benzene present as an emulsion during the preparation of said silica gel.

17. A process which comprises mixing a mineral acid with a hydrocarbon, adding a water-soluble silicate to said mixture so as to form a silica gel, drying said gel, and passing a gaseous stream containing said hydrocarbon over said silica gel so as to remove the hydrocarbon from said gaseous stream, said hydrocarbon selected from the group consisting of benzene and substituted benzene, said substituted benzene having at least one attached acyclic hydrocarbon radical, the total number of carbon atoms in the substituents not exceeding six.

18. A process which comprises mixing sulfuric acid and benzene, adding a water-soluble silicate to said mixture so as to form a silica gel, drying said gel, and passing a gaseous stream containing benzene over said silica gel so as to remove benzene from said gaseous stream.

19. The process of claim 1 in which said gel-forming constituents include at least one metal oxide-forming constituent.

20. The process of claim 2 in which the gel formed contains alumina.

21. The process of claim 2 in which the gel formed contains silica and alumina.

22. The process of claim 2 in which the volume of hydrocarbon is in the range of 2–200% of the water in said hydrogel-forming constituents.

23. The process of claim 3 utilizing benzene as the selected hydrocarbon.

24. The process of claim 5 in which the volume of benzene is in the range of 2–200% of the water present.

25. A process for preparing a silica gel having an increased total capacity for benzene which comprises forming an emulsion of benzene in an aqueous solution of sodium silicate and sulfuric acid, the proportions of silicate and acid being such as to cause precipitation of silica, the volume of benzene being about equal to the volume of water present; and converting the resulting precipitate to a dry hard gel.

26. A process for removing one of the hydrocarbons from a gaseous stream containing a hydrocarbon selected from the group consisting of benzene and substituted benzene, said substituted benzene having at least one attached acyclic hydrocarbon radical, the total number of carbon atoms in the substituents not exceeding 6, which comprises contacting said gaseous stream with a gel-type adsorbent made by precipitation of the gel in the presence of the hydrocarbon to be removed.

27. The process of claim 26 in which the gel comprises a metal oxide.

28. The process of claim 26 in which the gel comprises silica.

29. The process of claim 26 in which the gel comprises alumina.

30. The process of claim 26 in which the gel comprises silica-alumina.

31. A process for preparing a silica gel which comprises acidifying an emulsion of a hydrocarbon selected from the group consisting of benzene and substituted benzene, said substituted benzene having at least one attached acyclic hydrocarbon radical, the total number of carbon atoms in the substituents not exceeding six, and a silicate solution so as to form a silica hydrogel, and converting said hydrogel to a dry hard gel.

32. A process for preparing a silica gel which comprises acidifying an emulsion of toluene and a silicate solution so as to form a silica hydrogel, and converting said hydrogel to a dry hard gel.

33. A process for preparing a silica gel which comprises acidifying an emulsion of ethylbenzene and a silicate solution so as to form a silica hydrogel, and converting said hydrogel to a dry hard gel.

34. A process for preparing a silica gel which comprises acidifying an emulsion of cumene and a silicate solution so as to form a silica hydrogel, and converting said hydrogel to a dry hard gel.

35. A process for removing a hydrocarbon selected from the group consisting of benzene and substituted benzene, said substituted benzene having at least one attached acyclic hydrocarbon radical, the total number of carbon atoms in the substituents not exceeding six, from a gaseous stream which comprises passing said gaseous stream over a silica gel precipicated with the particular hydrocarbon present as an emulsion during the preparation of said gel.

36. A process for removing toluene from a gaseous stream containing toluene which comprises passing said stream over a silica gel which was made with toluene present as an emulsion during the preparation of said silica gel.

37. A process for removing ethylbenzene from a gaseous stream containing ethylbenzene which comprises passing said stream over a silica gel which was made with ethylbenzene present as an emulsion during the preparation of said silica gel.

38. A process for removing cumene from a gaseous stream containing cumene which comprises passing said stream over a silica gel which was made with cumene present as an emulsion during the preparation of said silica gel.

39. A process for removing paraxylene from a gaseous stream containing paraxylene which comprises passing said stream over a silica gel which was made with paraxylene present as an emulsion during the preparation of said silica gel.

40. A gel-type adsorbent prepared in accordance with claim 2.

41. A gel-type adsorbent prepared in accordance with claim 4.

42. A gel-type adsorbent prepared in accordance with claim 7.

43. A gel-type adsorbent prepared in accordance with claim 10.

References Cited in the file of this patent
UNITED STATES PATENTS

| | | |
|---|---|---|
| 1,825,707 | Wagner | Oct. 6, 1931 |
| 2,093,454 | Kistler | Sept. 21, 1937 |
| 2,137,505 | Derr | Nov. 22, 1938 |
| 2,377,841 | Marshall | June 5, 1945 |
| 2,392,767 | Robinson | Jan. 8, 1946 |
| 2,408,656 | Kirk | Oct. 1, 1946 |